United States Patent
Baldonado et al.

(10) Patent No.: US 7,860,918 B1
(45) Date of Patent: Dec. 28, 2010

(54) HIERARCHICAL FAIR SCHEDULING ALGORITHM IN A DISTRIBUTED MEASUREMENT SYSTEM

(75) Inventors: Omar Castillo Baldonado, Palo Alto, CA (US); Mansour Karam, San Francisco, CA (US); Michael Alan Lloyd, Belmont, CA (US); Jose-Miguel Pulido, Barcelona (ES)

(73) Assignee: Avaya Inc., Basking Ridge, NJ (US)

( * ) Notice: Subject to any disclaimer, the term of this patent is extended or adjusted under 35 U.S.C. 154(b) by 868 days.

(21) Appl. No.: 11/459,834

(22) Filed: Jul. 25, 2006

Related U.S. Application Data (60) Provisional application No. 60/810,491, filed on Jun. 1, 2006.

(51) Int. Cl.
*G06F 15/16* (2006.01)
(52) U.S. Cl. .......... 709/201; 709/223; 709/224
(58) Field of Classification Search .......... 709/201, 709/223, 224
See application file for complete search history.

(56) References Cited

U.S. PATENT DOCUMENTS

| | | | |
|---|---|---|---|
| 4,187,392 A | 2/1980 | Safford | |
| 5,271,000 A | 12/1993 | Engbersen et al. | |
| 5,448,639 A | 9/1995 | Arazi | |
| 5,610,951 A | 3/1997 | Higginson et al. | |
| 5,768,520 A | 6/1998 | Dan et al. | |
| 6,192,354 B1 * | 2/2001 | Bigus et al. | 706/46 |
| 6,483,811 B1 | 11/2002 | Jabbarnezhad | |
| 6,704,883 B1 * | 3/2004 | Zhang et al. | 709/224 |
| 6,934,934 B1 * | 8/2005 | Osborne et al. | 709/224 |
| 6,963,533 B2 | 11/2005 | Kukic | |
| 7,031,264 B2 | 4/2006 | Adhikari et al. | |
| 7,161,902 B2 | 1/2007 | Carter et al. | |
| 7,386,522 B1 * | 6/2008 | Bigus et al. | 709/202 |
| 2003/0084010 A1 * | 5/2003 | Bigus et al. | 706/6 |
| 2004/0010584 A1 * | 1/2004 | Peterson et al. | 709/224 |
| 2004/0057580 A1 | 3/2004 | Tie et al. | |
| 2004/0071085 A1 | 4/2004 | Shaham et al. | |
| 2004/0121749 A1 | 6/2004 | Cui et al. | |
| 2005/0068907 A1 | 3/2005 | Garg et al. | |
| 2006/0050649 A1 | 3/2006 | Botton-Dascal et al. | |

(Continued)

OTHER PUBLICATIONS

"Modular arithmetic" from Wikipedia, the free encyclopedia; http://en.wikipedia.org/wiki/Modular_arithmetic; printed Nov. 14, 2005; 4 pages.

(Continued)

*Primary Examiner*—Phuoc Nguyen
(74) *Attorney, Agent, or Firm*—Sheridan Ross P.C.

(57) ABSTRACT

The present invention provides embodiments of a network monitoring system that includes a scheduling agent for generating groupings of test agents and scheduling network measurements to be performed by each test agent grouping. The system may provide identifiers to members of first and second sets of objects. Then, the system can generate first and second sequences of the identifiers for each of the first and second sets, respectively and associate the identifiers to provide a plurality of groupings of identifiers. Finally the system may schedule a corresponding event for each of the grouping of identifiers. The systems and methods present can require very little state memory, ensure fair coverage of the object groupings; and can avoid the problems associated with round robin scheduling.

20 Claims, 6 Drawing Sheets

U.S. PATENT DOCUMENTS

2007/0076605 A1    4/2007    Cidon et al.

OTHER PUBLICATIONS

"Modular Arithmetic"; http://www.cut-the-knot.org/blue/Modulo.shtml; printed Nov. 14, 2005; 4 pages.

"Primitive root modul n"; http://primitive-root-modulo-n.area51.ipupdater.com/; printed Nov. 14, 2005; 2 pages.

"Coprime" from Wikipedia, the free encyclopedia; http://en.wikipedia.org/wiki/Coprime; printed Nov. 14, 2005; 2 pages.

"Relatively Prime"; from Mathworld; http://mathworld.wolfram.com/RelativelyPrime.html; printed Nov. 14, 2005; 3 pages.

PlanetMath.org; definition of coprime; http://planetmath.org/encyclopedia/Coprime.html; printed Nov. 14, 2005; 1 page.

Sebastián Martin Ruiz; "Applications of Smarandache Function, and Prime and Coprime Functions" Smaranda@teleline.es; www.terra.es/personal/smaranda; American Research Press Rehoboth 2002; 25 pages.

Paul Garrett; "Abstract Algebra: Lectures and Worked Examples for a Graduate Course"; Jul. 8, 2005; http://www.math.umn.edu/~garrett/; 222 pages.

* cited by examiner

HIERARCHICAL FAIR SCHEDULING ALGORITHM IN A DISTRIBUTED MEASUREMENT SYSTEM

CROSS REFERENCE TO RELATED APPLICATION

The present application claims the benefits of U.S. Provisional Application Ser. No. 60/810,491, filed Jun. 1, 2006, of the same title and which is incorporated herein by this reference.

FIELD OF THE INVENTION

The invention relates generally to scheduling algorithms and particularly to distribute measurement systems in distributed processing networks.

BACKGROUND OF THE INVENTION

Packet-based voice telecommunications, such as Voice over Internet Protocol, are becoming increasingly important. Such telecommunications offer users greater flexibility at lesser cost. The primary drawback of packet-based voice telecommunications continues to be Quality of Service or QoS. Voice telephony depends on reliable, low latency, real-time delivery of audio data. In VoIP, values for latency, packet loss, and jitter can increase substantially, particularly during periods of heavy network traffic, causing a user to experience a much poorer quality of communication (e.g., audio or video distortion, unacceptable levels of asynchronization between audio and video streams, etc.) than would be experienced if the call were made by a traditional circuit-switched telephony network.

Figure 1:
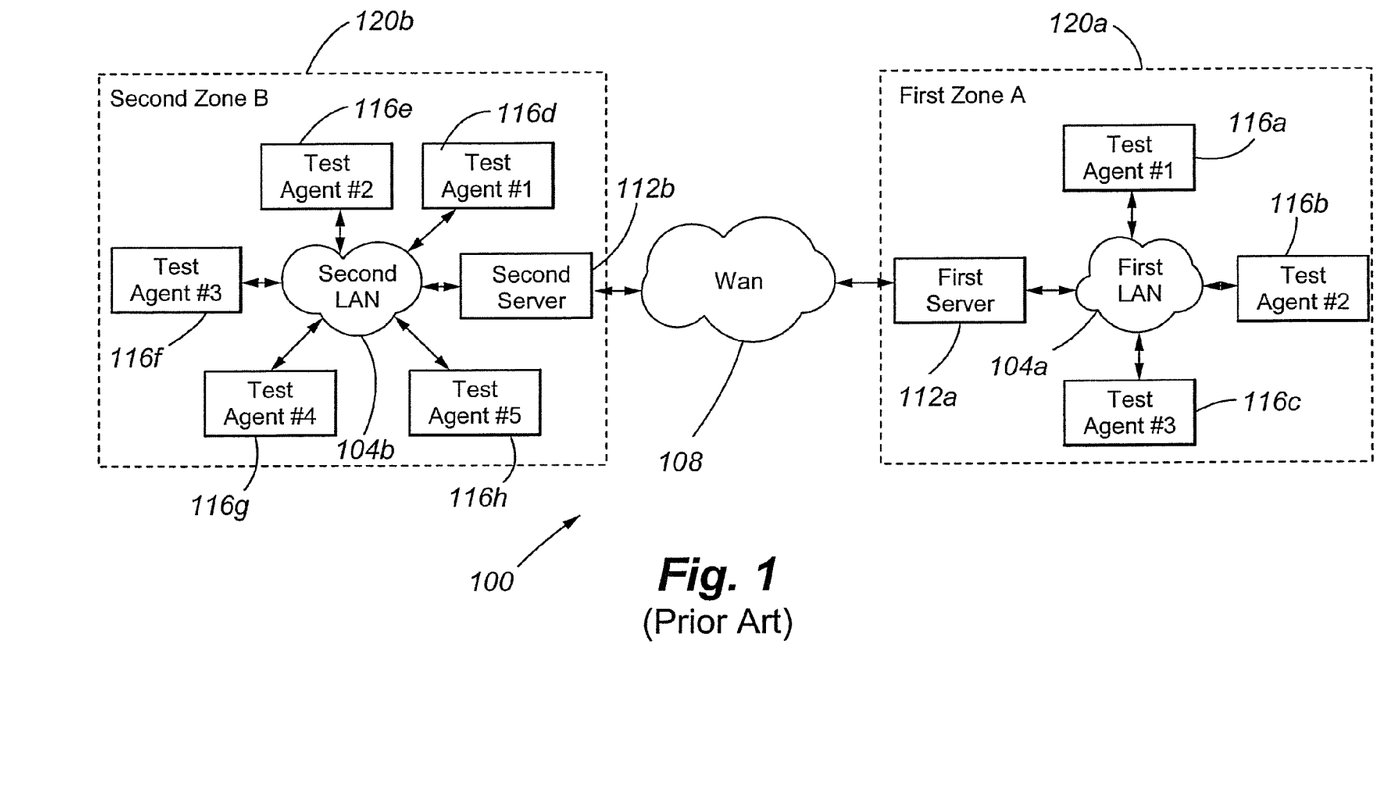
FIG. 1 is a prior art block diagram of a prior art hierarchical test system.

Network measurement systems are normally employed to monitor the causes of QoS problems, such as a failure of a link or system component and traffic congestion (e.g., blackouts and brownouts), and to ensure compliance by service providers with Service Level Agreements. For example, monitors collect Real-Time Control Protocol or RTCP packets and test agents generate and send test packets to collect network metrics that can be used for a variety of purposes including call admission control. FIG. 1 shows a typical hierarchical network measurement system. The wireline and/or wireless network backbone comprises first and second Local Area Networks or LANs 104*a,b* connected by a Wide Area Network or WAN 108.

The network backbone is divided into zones, based on suitable criteria, such as physical or logical location. In a first zone 120*a*, the first LAN 104*a* interconnects a first server 112*a* and first, second, and third test agents 116*a-c*. In a second zone 120*b*, the second LAN 104*b* interconnects a second server 112*b* and first, second, third, fourth and fifth test agents 116*d-h*. The agents measure one or more parameters indicative of communication path quality, such as round trip time, jitter buffer delay, jitter, packet loss burst size, a number of our-of-order packets, an out-of-order distance, Reservation Protocol status, call state, sender channel state, IP Differential Service Code Point, available bandwidth, router buffer size, latency, packet loss, router bandwidth utilization, router processor utilization, and/or bit error rate.

The system 100 gathers both zone-to-zone measurements and test agent-to-test agent measurements within a zone. Zone-to-zone measurements between two zones, such as the first and second zones 120*a,b* (and over the WAN 108), are obtained by testing between any test agent in the first zone 120*a* and any agent in the second test zone 120*b*. If only zone-to-zone measurements were of interest, a pair of test agents in the first and second zones could be randomly selected, and a measurement conducted between them. The random selection and measurement performance would be repeated at selected time intervals to provide a steady rate of measurements between the first and second zones.

This approach can result in potentially very large inter-measurement periods between agent test pairs. For example, assuming that the first and second zones each had ten agents and that a measurement were to be conducted between the first and second zones at every period T, the average period of measurements between a given test agent in the first zone and a test agent in the second zone is 100T, that is, there is a 1% probability that this period is ten times as large, i.e., 1,000T. Given that the monitoring system uses these test measurement results to arrive to conclusions about the connectivity between the test agents, it is highly desirable to maintain the measurement period between members of a given test agent pair as small and as regular as possible (ideally less than 200T).

To realize a relatively small and regular measurement period between the members of a test agent pair by scheduling between the test agents in the first and second zones in a round robin fashion. However, the round robin approach can lead to two problems. First, the randomness in the sequence of test agent pairs being tested can be lost. This can adversely affect the measurement results. Loss of randomness in the measurement periods and sequences can cause synchronization effects to occur. Second, "shotgun" effects can take place. Such effects occur when a selected test agent is exercised too intensely. For example, a simple double for loop across the two sets of test agents corresponding to the two zones would result in having each test agent in the first zone send measurements, in sequence, to all test agents in the second zone. This can over-load the test agent. Test agents may be embedded in a critical device (e.g., phone), and overloading the test agent can result in potentially disastrous problems affecting the critical device.

SUMMARY OF THE INVENTION

These and other needs are addressed by the various embodiments and configurations of the present invention. The present invention is directed generally to a scheduling algorithm for scheduling events to be performed interactively by objects in two object sets.

In one embodiment, the present invention is directed to a method including the steps:

(a) providing identifiers to members of first and second sets of objects (the identifiers used for the members of a set being unique within that set and being numbered, typically consecutively within each set);

(b) using modular arithmetic to generate first and second sequences of the identifiers for each of the first and second sets, respectively;

(c) associating identifiers from the first and second sequences to provide a plurality of groupings of identifiers (each grouping of identifiers comprising at least one identifier from each of the first and second sequences); and (d) scheduling a corresponding event for each of the grouping of identifiers. As used herein, "consecutively numbered" means that the numbers are in increasing or decreasing order without duplication. Thus, the sequences 1, 2, 3, 4, 5, 6, 7, 8, 9; 1, 3, 5, 7, 9; 9, 8, 7, 6, 5, 4, 3, 2, 1; and 9, 7, 5, 3, 1 are consecutively numbered.

In one configuration, the objects in the first and second sets are test agents, and the event is performing measurements of one or more parameters indicative of communication path quality, such as round trip time, jitter buffer delay, jitter, packet loss burst size, a number of our-of-order packets, an out-of-order distance, Reservation Protocol status, call state, sender channel state, IP Differential Service Code Point, available bandwidth, router buffer size, latency, packet loss, router bandwidth utilization, router processor utilization, and/or bit error rate.

Various scheduling algorithms can be employed that use modular arithmetic. As will be appreciated, modular arithmetic refers generally to a system of arithmetic for integers where numbers "wrap around" after they reach a certain value, known as the modulus. Modular arithmetic can be understood with reference to the arithmetic of hours on a clock face. If one begins at 7 o'clock and adds 8 hours, then rather than ending at 15 o'clock (as in usual addition), one is at 3 o'clock. Likewise if one starts at noon and counts off 7 hours three times (3×7), one ends up at 9 o'clock (rather than 21). When one reaches 12, he starts over again. Twelve is called the modulus and a clock is an example of arithmetic modulo 12.

Assuming first and second sets of objects for which the memberships are coprime or relatively prime, a first scheduling algorithm is:

$i=i+1$ (modulo ($N$)); and $j=j+1$ (modulo ($M$)).

In the algorithm, i is the identifier for a selected object in the first set, j is the identifier for a selected object in the second set, N is the number of members in the first set, and M is the number of members in the second set. As mentioned, N and M are coprime integers. In mathematics, the integers a and b are said to be coprime or relatively prime when they have no common factor other than 1 and −1, or equivalently if their greatest common divisor is 1.

When N and M are not coprime, a second scheduling algorithm is:

$i=i+1$ (mod($Na$));

$j=j+1$ (mod($M$));

$i=i+1$ (mod($N-Na$))+$Na$; and $j=j+1$ (mod($M$)).

In the algorithm, Na is coprime to M, and N−Na is coprime with M.

Yet another scheduling algorithm uses the following relationships:

$i=k \bmod(N)$;

$j=k+l \bmod(M)$;

In the algorithm, k and l are whole numbers selected such that l<Greatest Common Divisor (N, M) and k<Least Common Multiple (N, M).

A further algorithm uses the following relationships:

$i=(P)(k)+A \bmod(M)$; and $j=(Q)(k)+l+B \bmod(N)$.

P is an integer selected to be coprime with M, Q is an integer selected to be coprime with N, A is an integer selected to be between 0 and (M−1), B is an integer selected to be between 0 and (N−1). By altering the values of P, A, Q, and/or B, during each loop through the algorithm, the groupings of identifiers are reordered. This can avoid coincidental recurrences of the same grouping of identifiers.

None of the latter two algorithms require N and M to be coprime.

The present invention can provide a number of advantages depending on the particular configuration. For example, the above algorithms can require very little state memory by the computer between object grouping instants. Rather than maintaining an extensive record of identifier groups previously generated and scheduled and/or an array of all possible test agent groupings, the above algorithms generally require only memory of the values of the various counters and parameters used in the equations. By using prime numbers to ensure fair coverage of the object groupings, the algorithms can avoid the problems associated with round robin scheduling. As a result, the algorithms can provide both random selection and ordering of the object groupings (to avoid unforeseen synchronization) but also fair coverage of the object groupings. In network performance monitoring, the invention can provide steady inter-zone measurements. Steady inter-test agent measurements, and randomness injected both in the scheduling order and the inter-zone measurement periods.

These and other advantages will be apparent from the disclosure of the invention(s) contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 2:
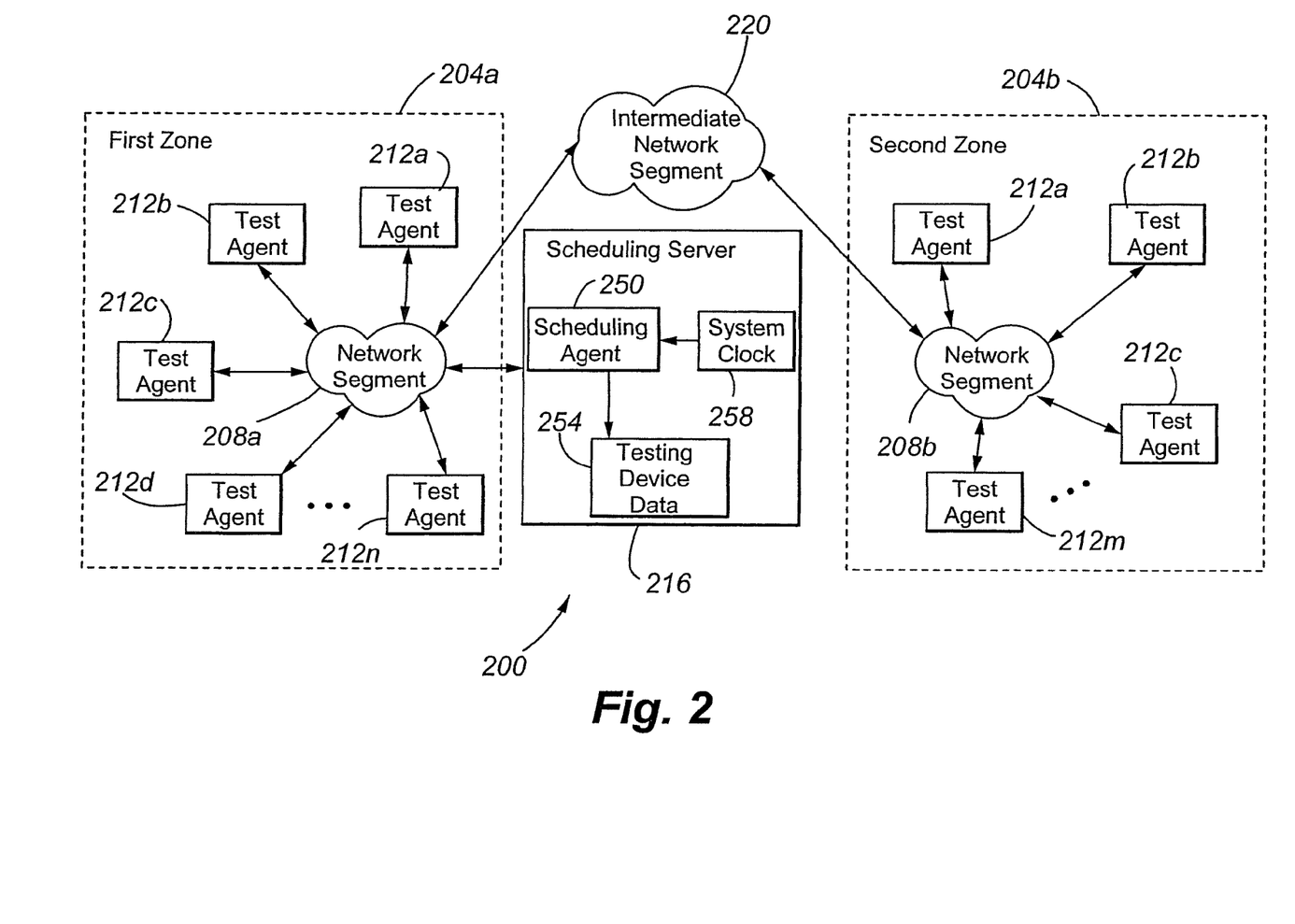
FIG. 2 is a block diagram of a hierarchical test system according to an embodiment of the present invention.

FIG. 2 depicts a hierarchical test system according to an embodiment of the present invention. The system 200 includes first and second zones 204a,b, each including a network segment 208a,b, and a plurality of test agents 212a-n and 212a-m, respectively. A scheduling server 216 is in communication with of the first and second zones. Communications between the first and second zones 204a,b pass over an intermediate network segment 220.

The first and second zones 204a'b can be defined using any suitable criteria, including physical and/or logical location or proximity.

The network segments 208a,b and intermediate network segment 220 can be any form of network or member thereof, such as a Local Area Network, Regional Area Network, Metropolitan Area Network, Wide Area Network, and the like. They may be wireline or wireless or a combination thereof. They may be packet- or circuit-switched or a combination thereof. Typically, each of the network segments is a part of an enterprise network.

The test agents can be any computational device for sending and receiving test or measurement signals. The agents measure one or more parameters indicative of communication path quality, such as round trip time, jitter buffer delay, jitter, packet loss burst size, a number of our-of-order packets, an out-of-order distance, Reservation Protocol status, call state, sender channel state, IP Differential Service Code Point, available bandwidth, router buffer size, latency, packet loss, router bandwidth utilization, router processor utilization, and/or bit error rate. They may be standalone devices or incorporated into or embedded, as software and/or hardware, in another device, such as a gateway, communication device (e.g., digital telephone, Personal Computer, laptop, IP hardphone, IP softphone, Personal Digital Assistant, and switch or server). An example of a suitable test agent is that included in Avaya Inc.'s Conversion Network Analyzer™.

The scheduling server 216 generates and forwards commands to test agent pairs to exchange test signals at determined times and receive and administer the results of or measurements from the test signals. The scheduling agent 250 selects test agent pair members between zones for inter-zone measurements and/or within a zone for intra-zone measurements and generates scheduling information for the selected test agent pair members to conduct measurements. The test agent database 254 contains information about each testing device used in test agent selection while the system clock 258 provides timing information used in generating scheduling information. The database 254 includes, for example, test agent identifier, test agent address (e.g., IP address and Media Access Control or MAC address), and test agent configuration information (e.g., port number or address.

Although the system 200 is discussed with reference to only two zones and a set number of test agents in each zone, it is to be understood that any number of test zones containing any number of test agents may be employed. Moreover, it is to be understood that the system 200 is described with reference to FIG. 2 for purposes of illustration only and is not limited to the architecture of FIG. 2.

In one configuration, the scheduling agent 250 uses coprime numbers to generate random or pseudo-random sequences of unique test agent pairs and optionally provides randomization of or variation in test agent numbering in each cycle to prevent repeat sequences. The sequences are generated using one or more scheduling algorithms based on sets of test agents with the memberships of the sets being expressed by coprime numbers.

Prior to discussing the more complex scheduling algorithms of the present invention, an example based on a simple scheduling algorithm according to an embodiment of the invention and the prior art round robin technique will be discussed and compared. With reference to FIG. 1, assign to the agents 116a,b, and c in the first zone 120a identifiers 1, 2, and 3, respectively, and to the agents 116d-h in the second zone 120b the identifiers 1, 2, 3, 4, and 5, respectively. The memberships of test agents in each of the first and second zones are coprime numbers (e.g., 3 and 5). According to the scheduling algorithm of an embodiment of the invention, start with the test agent pair (1,1), simultaneously increment the identifier for each test agent device for both the source and destination zone, and modulo the number of test agents in the respective zone. This scheduling algorithm is characterized by the following pseudo-code:

count=0, i=0, j=0 {
schedule test between i+1 and j+1;
i=i (mod (N));
j=j (mod (M));
count ++
}

The fifteen possible agent pairs generated by this algorithm are: (1,1), (2,2), (3,3), (1,4), (2,5), (3,1), (1,2), (2,3), (3,4), (1,5), (2,1), (3,2), (1,3), (2,4), and (3,5). Using a round robin scheduler, the following sequence would be provided: (1,1), (1,2), (1,3), (1,4), (1,5), (2,1), (2,2), (2,3), (2,4), (2,5), (3,1), (3,2), (3,3), (3,4), and (3,5). At the end of this cycle, in which the fifteen test agent pairs are generated, the ordering of test agents in each zone is changed, and the algorithm repeated. Comparing the two sequences, the sequence generated using simple round-robining generates all combinations having test agent 1 for source, before moving to the next test agent. This sequential repetition with respect to one test agent is undesirable as noted previously.

While the scheduling algorithm above works for zones having test agent memberships that are coprime, it normally does not work if the zone test agent memberships are not coprime. By way of example, assume test agent zone memberships of two and four for the first and second zones, respectively. Using the scheduling algorithm provides the following sequence: (1,1), (2,2), (1,3), (2,4), (1,1), (2,2), (1,3), and (2,4). As can be seen from the sequence, some test agent pairs are repeated, namely (1,1), (2,2), and (1,3), while others are omitted completely, namely (1,4), (1,2), (2,3), and (2,1). The scheduling algorithms of other embodiments use the concept of coprime memberships to provide complete test agent sequences for test agent zone pairs of any relative sizes.

Although the scheduling algorithm produces a pseudorandom sequence of test agent parings, it is still possible to have coincidences, or clusters of occurrences of a given test agent identifier. For example, test agent 1 in the first zone may appear in several consecutive pairings. Randomization is intended to break up or disrupt such coincidences to provide a bound on one or both members of a given test group pair. In the example above, randomization can be done by any suitable technique. For example, an array can be created using the test agent identifiers pairings output by the scheduling algorithm. Randomly or pseudo-randomly test agent pairings in the array can be selected and their positions swapped. This has the effect of "shuffling" the pairings in a manner similar to shuffling a deck of cards. In another technique, a random or pseudo-random number is assigned to each test agent pairing in the sequence output by the scheduling algorithm. The pairings are then re-ordered based on the assigned random number. The re-ordering may be in ascending or descending numerical order, for instance. In yet another technique, a hash function is used to reorder the test agent pairings. Other techniques will be readily apparent to those of ordinary skill in the art.

In a second embodiment, a scheduling algorithm is provided that divides a test agent membership that is not coprime into two subsets, each having coprime memberships. Assume scheduling is to be performed between members of a first set S1 comprising N test agents and a second set S2 comprising M agents, wherein N is preferably larger than M. The system clock 258 is characterized by a click T. This embodiment will now be discussed with reference to FIG. 3.

Figure 3:
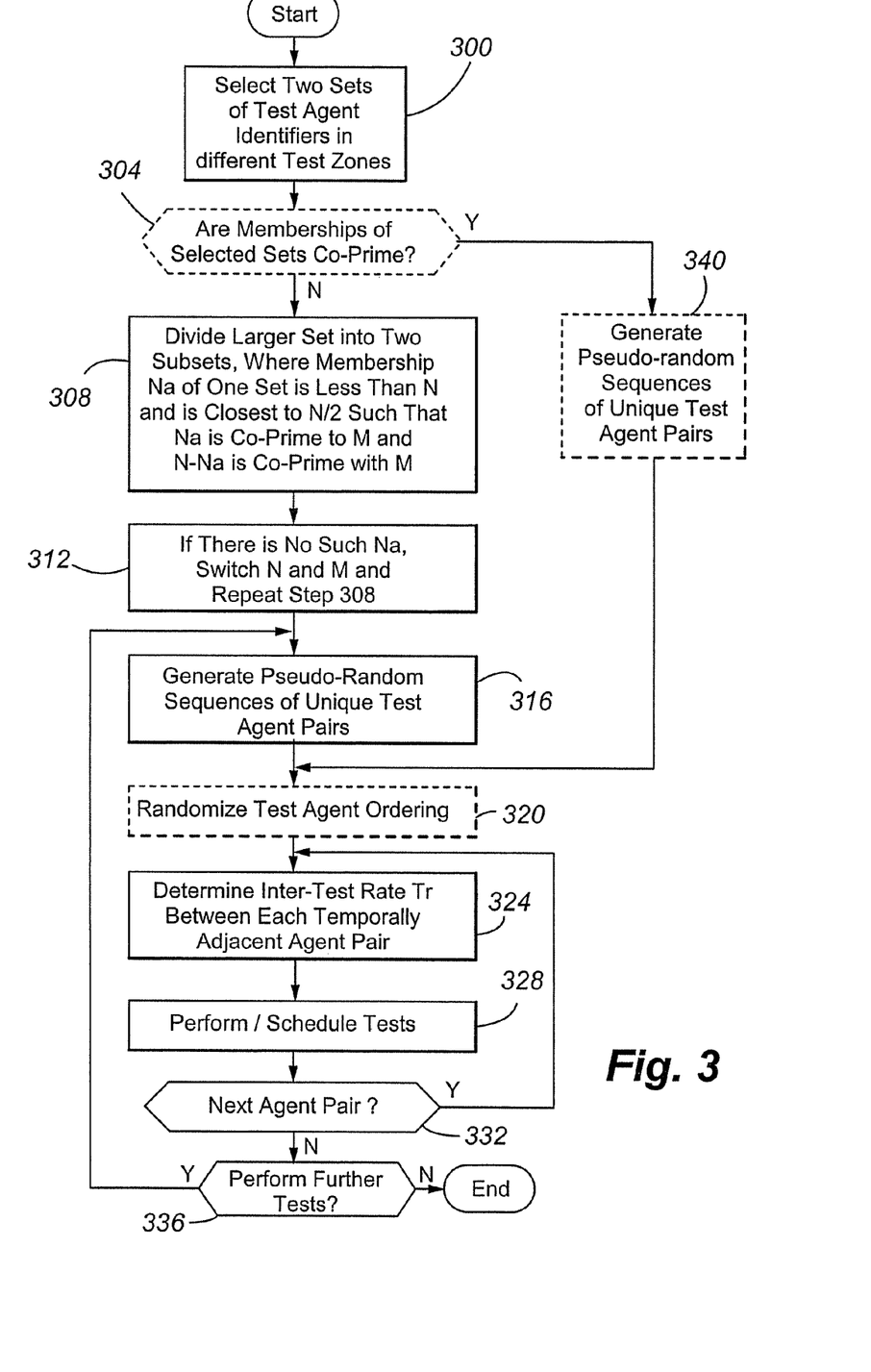
FIG. 3 is a flow chart of scheduling server operation according to an embodiment of the present invention.

In step 300, the scheduling agent 250 selects two sets of test agent identifiers in different test zones.

In optional decision diamond 304, the agent 250 determines whether the memberships of the selected sets are coprime. If so, the agent 250 proceeds to optional step 340 and generates the sequences using the scheduling algorithm of the prior embodiment. If not, find the number Na<N that is closest to N/2, such that Na and N−Na are each coprime with M.

In step 312, if there is no Na satisfying the above relationships N and M are swapped and step 312 is repeated.

After step 308, the agent 250 generates, in step 316, pseudo-random sequences of unique test agent pairs. When the memberships M and N are not coprime, the scheduling algorithm uses the following pseudo-code:

```
count=0, i=0, j=0
while (count<NaxM) {
Schedule test between i+1 and j+1;
i=i (mod (Na));
j=j (mod (M));
count++;
}
count=0; i=0; j=0
while (count<(N−Na)xM) {
schedule test between i+1 and j+1;
i=i (mod (N−Na))+Na;
j=j (mod (M));
count++;
}
```

In the above code, i is the incremental counter providing the identifier of the selected test agent in S1, and j is the incremental counter providing the identifier of the selected test agent in S2, such that the selected test agent pair is (i,j).

To explain the code, assume S1a is the set of test agents assigned identifier numbers 1 to Na, S1b is the set of test agents assigned identifier numbers Na+1 to N, and G1=(S1a, S2) and G2=(S1b, S2). As can be seen from the above code, the scheduling algorithm divides one of the test agent sets (e.g., S1 in the example) into two subsets (namely S1a and S1b) and generates sequences using the scheduling algorithm of the prior embodiment applied independently to the two groups G1 and G2. The first loop generates a sequence for group G1 while the second loop generates a sequence for group G2.

Where N and M are each ten and Na is 3 (S1a having identifiers 1-3 and S2a having identifiers 4-10), the code produces the following combinations:

For group G1:

(1,1), (2,2), (3,3), (1,4), (2,5), (3,6), (1,7), (2,8), (3,9), (1,10), (2,1), (3,2), (1,3), (2,4), (3,5), (1,6), (2,7), (3,8), (1,9), (2,10), (3,1), (1,2), (2,3), (3,4), (1,5), (2,6), (3,7), (1,8) (2,9), (3,10).

For group G2:

(4,1), (5,2), (6,3), (7,4), (8,5), (9,6), (10,7), (4,8), (5,9), (6,10), (7,1), (8,2), (9,3), (10,4), (4,5), (5,6), (6,7), (7,8), (8,9), (9,10), (10,1), (4,2), (5,3), (6,4), (7,5), (8,6), (9,7), (10,8) (4,9), (5,10), (6,1), (7,2), (8,3), (9,4), (10,5), (4,6), (5,7), (6,8), (7,9), (8,10), (9,1), (10,2), (4,3), (5,4), (6,5), (7,6), (8,7), (9,8), (10,9), (4,10), (5,1), (6,2), (7,3), (8,4), (9,5), (10,6), (4,7), (5,8) (6,9), (7,10), (8,1), (9,2), (10,3), (4,4), (5,5), (6,6), (7,7), (8,8), (9,9), (10,10). As can be seen from the pseudo-code the number of steps to generate the above test agent pairs in groups G1 and G2 is equal to the total number of members in G1 and G2.

In a preferred configuration, before step 316 is repeated, the test agent identifiers are re-assigned randomly (with identifiers 1-3 being re-assigned randomly in S1a and identifiers 4-10 being re-assigned randomly in S1b) before the sequence is regenerated. In this manner, the likelihood of coincidences in the sequence is reduced.

In optional step 320, test agent ordering in the sequence is randomized as noted above.

In step 324, the InterMeasurement Time or IMT, or inter-test rate $T_r$, between each temporally adjacent agent pair is determined. As used herein, IMT refers to the time between temporally adjacent test agent measurements. Although a fixed interval may be employed, the IMT and/or Tr may be varied, depending on the application, to produce a variable periodic test frequency.

In one configuration, chatter measurement scheduling is designed to achieve the same measurement rate for each pair of zones (cell). That translates into test agent pairs having different measurement rates, depending on the agent's location in the zone tree. For example, for a balanced tree with Z subnodes per node and an overall measurement rate R, test agent pairs would see a measurement rate of $R*(Z/N^2)^i$, where i is the level's index. In certain applications, spareness in test agent pair measurement rate can lead to a non regular stream of measurements which makes it difficult to compute ANS style rating and availability figures (e.g., due to false positives in outage computation). Moreover, in this configuration there is no bound on the Inter-Measurement Time (IMT) length of a given test agent pair, which can exacerbate the problem.

In another configuration, a timing algorithm producing a variable periodic test frequency is used. If T is the amount of time between consecutive measurements, IMT=T*M*N is the amount of time between consecutive measurements for a given test agent pair, where N and M are the cardinalities of the two sets, S1 and S2. In a particularly preferred configuration, the timing algorithm ensures that at least one test between a selected test agent pair in S1 and S2 is performed in at most a 2×IMT period. The preferred timing algorithm is Tr=T+delta T, wherein delta T is determined by any number of mathematical functions, with a uniform random variable function Unif(a,b) being preferred. A uniform random variable function uses a standard pseudo-random number generator to generate an integer value between zero and a maximum integer value and transform the generated integer value into a number in the range of zero to one (e.g., a floating point number). The transformed integer value may then be transformed into a value between −0.1 and +0.1 by a linear mathematical function. The further transformed integer value may then be used to increase or decrease the value T to yield Tr. In a particularly preferred configuration, delta T is determined using the function Unif(0.9T, 1.1T). As will be appreciated, mathematical distribution functions other than the Uniform Random Variable function (such as the Poisson distribution, normal distribution, lognormal distribution, exponential distribution, Pareto distribution, gamma distribution, Beta distribution, Cauchy distribution, t distribution, F distribution, Chi-Square distribution, Weibull distribution, Fatigue Life distribution, double exponential distribution, Power lognormal distribution, Turkey-Lambda distribution, extreme value Type I distribution, and binomial distribution) and variables other than 0.9 and 1.1 may be used in the equation. Further assume scheduling starts at $t_0$. At each $t_n=nT+Tr$, the scheduling agent 250 selects one test agent P1 in S1, one test agent P2 in S2, and conducts a test between P1 and P2. In one variation, the scheduling agent 250 schedules a test every $t_n=t_{n-1}+Tr$. In another variation, the scheduling agent further requires $t_n=nT+Tr$ to guarantee that each test agent pair will get at least one test in a 2IMT period, given that the random walk $t_n = t_{n-1} + Tr$ is quite random and difficult to bound. A random walk can be provided by the equation: $Tr = T + Unif(1-(1/(M \times N))T), (1+(1/(M \times N))T))$. The test time for each agent pair is then determined relative to $t_0$.

Using one of the above timing algorithms, any test agent in group G1 will have an IMT bounded by $((N-Na)-0.2)T$ and $(N+Na+0.2)T$, and any test agent in group G2 will have an IMT bounded by $(Na-0.2)T$ and $(N+(N-Na)+0.2)T$. Assuming that $Na \times (N-Na)$ close to N/2 and assuming that $0.2 << N$, any test agent pair in group G will have an $IMT_{actual}$ approximately bounded as follows:

$(1/2)IMT < or = IMT_{actual} < or = (1+\frac{1}{2})IMT$.

After determining a test time for a selected pair of test agents, the agent 250, in step 328, issues commands to the selected pair of test agents at the appropriate test time for a test to be performed. The commanded pair of test agents, in step 328, performs the tests at the scheduled time and reports the results to the agent 250.

In decision diamond 332, the agent 250 determines if there is a next agent pair in the previously generated sequence. If so, the agent 250 returns to and repeats steps 324 and 328 with respect to that agent pair. If not, the agent 250 proceeds to decision diamond 336 and determines whether further tests are to be performed. If not, the agent 250 terminates operation. If so, the agent returns to step 316 and generates a next pseudo-random sequence of unique test agent pairs.

In a third embodiment, the sequences of test agent pairs are generated using a different scheduling algorithm. For test agent sets S1 and S2 of cardinalities N and M, respectively, the algorithm is as follows:

(1) randomly assign numbers 1 to N and numbers 1 to M to all test agents in groups S1 and S2, respectively; and (2) generate all different $N*M$ (i,j) pairs where the first element pertains to a set of size N and the second element to another set of size M. This is achieved with the following algorithm:

for (l=0; l<GCD(N,M); ++l)
for (k=0; k<LCM(N,M); ++k)

$i = k+1 \mod(M)$

$j = (k+l)+1 \mod(N)$

In the above equation, GCD is the largest whole number that is smaller than or equal to N and M and divides N and M by an integer multiple (or whole number), LCM is the smallest whole number that is larger than or equal to N and M and both N and M multiply into by a whole number.

The scheduling algorithm in the second step normally generates all test agent pairs, and, in combination with the first step, ensures that, on every run, all pairs are generated in random order. The scheduling algorithm does not require test agent pair state between scheduling instants. It only needs to maintain the assignment of test agents to 1–N, 1–M numbers, and the current values of "k", "l", "i" and "j". Given that each time the algorithm runs all test agent pairs are generated in no particular order, IMT for measurements pertaining to a single test agent pairs is bounded by [0, 2*IMT].

It is thus theorized that the above algorithm is able to generate all different $N*M$ (i,j) pairs where the first element pertains to a set of size N and the second element to another set of size M. The proof is as follows:

(1) if N and M are coprime, $GCD(N,M)=1 \Rightarrow LCM(N,M)=N*M$. That means if the multiples of each number are represented in separate x lines, the lines would only have the same values at multiples of $N*M$. Using N=2 and M=3 as an example:

In this example, the lines would only coincide at 6 and 12. Therefore, by picking numbers at simultaneous positions in both lines starting from 0 until $N*M$, it is guaranteed we can generate $N*M$ different pairs before repetition starts, precisely the number needed.

(2) if N and M are not coprime, $GCD(N,M)=Z>1 \Rightarrow LCM(N,M)<M*N$. This means repetition of pairs in the x lines would start at LCM(N,M), and thus initially it seems we would not be able to generate all the required pairs.

However, the algorithm proposes that, after the first coincidence in the x lines (at LCM(N,M)), the algorithm starts again but with a shift of 1 in one of the lines. Given that repetition occurs at LCM(N,M) and $N*M$ samples are needed, GCD(N,M)–1 shifts are needed. It therefore must be proved that none of the GCD(N,M)–1 shifts needed would lead to repetition. It must be noted that any multiple of M and N can be expressed as multiples of GCD(N,M); that is, GCD(N,M) can be interpreted as the "building block" of the x lines. Using N=4, M=6 as example (GCD(4,6)=2):

The numbers in the lines would either coincide at multiples of N and M (12 and 24) or, more importantly, consecutive numbers would differ by at least GCD(N,M) (e.g., 4, 6, 8, 12, 16, 18, 20 . . . all differ by at least 2). This is so because GCD(N,M) is the minimum building block for the pair of numbers. Given that the minimum distance between synchronization is then GCD(N,M), a budget of GCD(N,M)–1 shifts of units of 1 is provided. Thus, one can generate: $LCM(N,M)*GCD(N,M)=N*M$ different pairs, precisely the amount needed.

It is not necessary that N and M be coprime; therefore, it is not necessary to look for a value Na such that Na and M are coprime, and (N–Na) and M are coprime.

The scheduling algorithm works as follows:
for (l=0; l<GCD(N,M); ++l)
for (k=0; k<LCM(N,M); ++k)

$i = k+1 \mod(M)$ $j = (k+l)+1 \mod(N)$

In the algorithm above, objects in both sets are selected by incrementing the object numbers by 1 in each iteration. However, after the algorithm has iterated through LCM(N,M) object pairs, the sequence is disrupted by adding an additional increment to the object number in the second set. This disruption reshuffles the sequences and prevents repetition. The result is that in N*M iterations, all N*M end point pairs are generated.

To illustrate this result, consider the (M=4, N=2) example.

Without the disruption, the algorithm is as follows:
    for (l=0; l<GCD(N,M); ++l)
    for (k=0; k<LCM(N,M); ++k)

$i=k+1 \mod(M)$

$j=k+1 \mod(N)$

The above algorithm produces the following test agent pairs:

(1, 1), (2, 2), (3, 1), (4, 2), (1, 1), (2, 2), (3, 1), (4, 2)

The result is not satisfactory, as only 4 of the 8 object pair combinations are generated.

In contrast, the following test agent pairs are generated using the following algorithm:
    for (l=0; l<GCD(N,M); ++l)
    for (k=0; k<LCM(N,M); ++k)

$i=k+1 \mod(M)$

$j=(k+l)+1 \mod(N)$

By inserting a disruption, however, this algorithm produces the following sequence:

(1, 1), (2, 2), (3, 1), (4, 2), (1, 2), (2, 1), (3, 2), (4, 1). Note that the disruption is inserted at the 5th pair, (1, 2). The disruption is the increment of the second object number by 1, so that one obtains (1, 1+1=2) instead of (1, 1).

Further note that without dividing in two groups, the algorithm loses the tight (1+1/2)*IMT bound. That is so because if the assignment of numbers to objects are randomized at each iteration, an object pair that could have been chosen to go first in one iteration could go last in the following iteration. Therefore, it is still desirable to divide a group of object pairs into two groups. This is done by choosing Na between 0 and N; however, given that this algorithm does not require that M and N are coprime, Na is not required to be chosen such that Na and M are coprime and such that (N−Na) and M are coprime.

Figure 4:
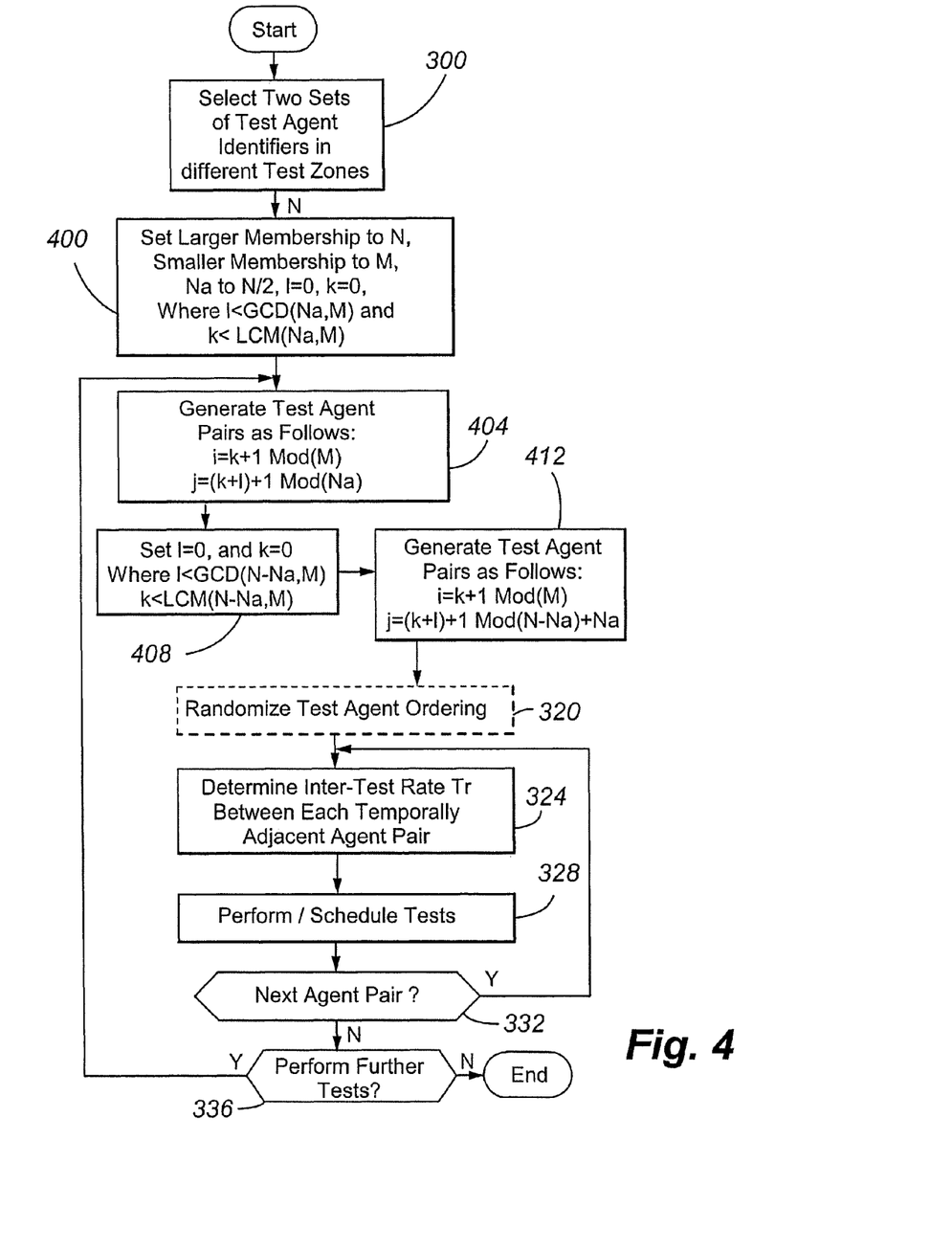
FIG. 4 is a flow chart of scheduling server operation according to an embodiment of the present invention.

A flowchart depicting a variant of the third embodiment will now be described with reference to FIG. 4. In this embodiment, the test agent pairs are not divided into two groups as in the second embodiment. In this variant, note that, if any of the sets is divided into two subsets, e.g., subsets of size Na and N−Na, the IMT boundary can be reduced to [0.5*IMT, 1.5*IMT], if both groups are of equal size. This boundary reduction is considered desirable, so the algorithm can be modified to achieve it. The pseudo-code of the modified algorithm is as follows:
    if (M>N) swap(M,N); // to avoid small subsets
    Na=floor(N/2); // to achieve equal size subsets
    count=0; i=0; j=0;
    for (l=0; l<GCD(Na,M); ++l)
    for (k=0; k<LCM(Na,M); ++k)
    schedule test between i+1 and j+1;
    i=k mod(M);
    j=(k+l) mod(Na);
    count ++;
    }
    count=0; i=0; j=0;
    for (l'=0; l'<GCD(N−Na,M); ++l')
    for (k'=0; k'<LCM(N−Na,M); ++k') {
    schedule test between i+1 and j+1;
    i=k' mod(M);
    (k'+l')mod(N−Na)+Na;
    count ++;
    }

In step 400, the larger membership of the two test agent set memberships is set to N and the smaller membership is set to M, the incremental counters l and k are set to zero, and Na is greater than or equal to N/2. Additionally, the rules governing the magnitudes of the integers I and k are:
    l<Greatest Common Divisor or GCD (Na, M) and k<Least Common Multiple or LCM (Na, M).

In step 404, the test agent pairs are generated as follows:

$i=k+1 \text{ modulo}(M)$ and

$j=(k+l)+1 \text{ modulo}(Na)$

In step 408, the rules governing the magnitudes of the integers l' and k' are:
    l'<GCD (N−Na, M) and k'<Least Common Multiple or LCM (N−Na, M). As will be appreciated, GCD is the largest whole number that is smaller than or equal to N−Na and M and divides N−Na and M by an integer multiple, and LCM is the smallest whole number that is larger than or equal to N−Na and M and both N−Na and M multiply into by a whole number. Thus, if N−Na is 2 and M is 4, the GCD is 2 and the LCM is 4. As will be appreciated, a number of algorithms, including those of the mathematician Euclid, can be used to determine the GCD, LCD, and LCM.

In step 412, further test agent pairs are generated as follows:

$i=k'+1 \text{ modulo}(M)$ and

$j=(k'+l')+1 \text{ modulo}(N-Na)+Na.$ An example will now be presented to illustrate the algorithm of the third embodiment. In the example, N=M=4, and the resulting number of different pairs should be 16. Step 408 is run with values Na=2, M=4, the greatest common divisor (GCD) and least common multiple (LCM) values are:
    GCD(Na,M)=GCD(2,4)=2
    LCM(Na,M)=LCM(2,4)=4
    The possible values of l and k are:
    l={0,1}
    k={0,1,2,3}:
    For l=0, the (i,j) pairs generated for all the values of k are:
    k=0: (1,1)
    k=1: (2,2)
    k=2: (3,1)
    k=3: (4,2)
    And for l=1, the generated pairs are:
    k=0: (1,2)
    k=1: (2,1)
    k=2: (3,2)
    k=3: (4,1)
    Step 412 is run with values N−Na=2, M=4, the GCD and LCM values are:
    GCD(N−Na,M)=GCD(2,4)=2
    LCM(N−Na,M)=LCM(2,4)=4
    The possible values of l' and k' are:
    l'={0,1}
    k'={0, 1, 2, 3}:
    For l'=0, the (i,j) pairs generated for all the values of k are:
    k'=0: (1,3)
    k'=1: (2,4)
    k'=2: (3,3)
    k'=3: (4,4)

And for l'=1, the generated pairs are:
k'=0: (1,4)
k'=1: (2,3)
k'=2: (3,4)
k'=3: (4,3)

Note that the total of generated pairs is 16, the expected one, and all pairs are different.

In a fourth embodiment of the present invention, a modified version of the scheduling algorithm is used. The algorithm by itself may have many sources of randomization, so it could actually be used to avoid the randomization of step 320. The pseudo-code for the modified version is as follows:

count=0; i=0; j=0;
for (l=0; l<GCD(N,M); ++l)
for (k=0; k<LCM(N,M); ++k) {
schedule test between i+1 and j+1;
i=Pk+F (mod(N));
j=Qk+l+G (mod(M));
count++;
}

In the above algorithm, "P", "F", "Q", and "G" are integers.

The modified version will still generate all different (i,j) pairs as long as P and Q are relatively prime to M and N respectively, and F and G are any number in the [0,N) and [0,M) ranges respectively (well known number theory result).

Therefore, each different combination of P,Q, F and G values will lead to a different pair ordering. We can compute the amount of different combinations:

P can take at least ~(N/ln N) values, i.e., the number of prime numbers below N. Similarly, Q can take at least ~(M/ln M) values, i.e., the number of prime numbers below M. F and G can take N and M values, respectively. Therefore, the total number of different combinations for these values is:

$$T \sim (N*M)^2/(\ln N * \ln M)$$

For (N=4,M=6), T~231, and for (N=M=100), T~2.5*10^7.

Note that the number of combinations is much less than the total possible number ((N*M)!), but the number is enough for scheduling test agents, especially as the test agent sets grow large.

With the modified algorithm, random assignment of numerical identifiers to members of each set (discussed above) is unnecessary, and the only state needed to maintain between scheduling instants are the parameters and variables of the algorithm.

To find F and G when the algorithm is initialized, one would randomly select a number from the [0,N) and [0,M) ranges, respectively. To find P (Q), one needs to find all numbers X in the (0,N) and (0,M)) ranges that have GCD(X, N) (GCD(X,M)) equal to 1. This search can be done every time the algorithm is initialized, or just once. The latter option would require the storage of all the relatively prime numbers in an array, i.e., additional state.

Figure 5A:
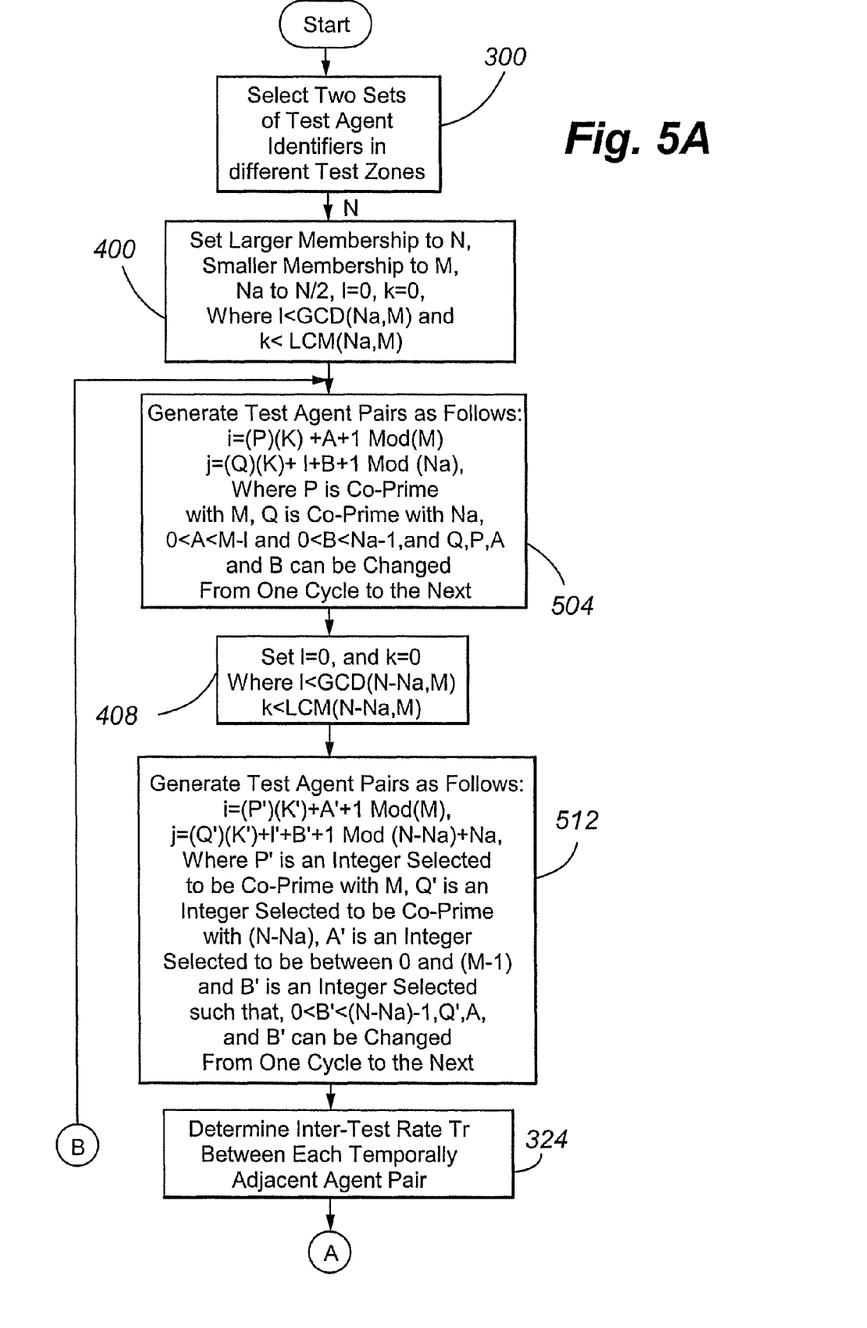
FIG. 5A is a flow chart of scheduling server operation according to an embodiment of the present invention.

Referring now to FIG. 5A, step 504 generates the first part of the test agent pair sequence using the equation:

For (l=0; l<GCD(Na,M); ++l)
For (k=0; k<LCM(Na,M); ++k)

$$i=(P)(k)+A+1 \mod(M)$$

$$j=(Q)(k)+l+B+1 \mod(Na)$$

wherein P is an integer selected to be coprime with M, and Q is an integer selected to be coprime with Na, A is an integer between 0 and (M−1), and B is an integer between 0 and (Na−1). Q, P, A, and B can be changed from one cycle to the next. This equation represents a variant of the fourth embodiment that is analogous to the variant noted above with respect to the third embodiment. In this variant, the set N is subdivided into two sets, namely Na and (N−Na) to achieve tighter IMT bounds.

Figure 5B:
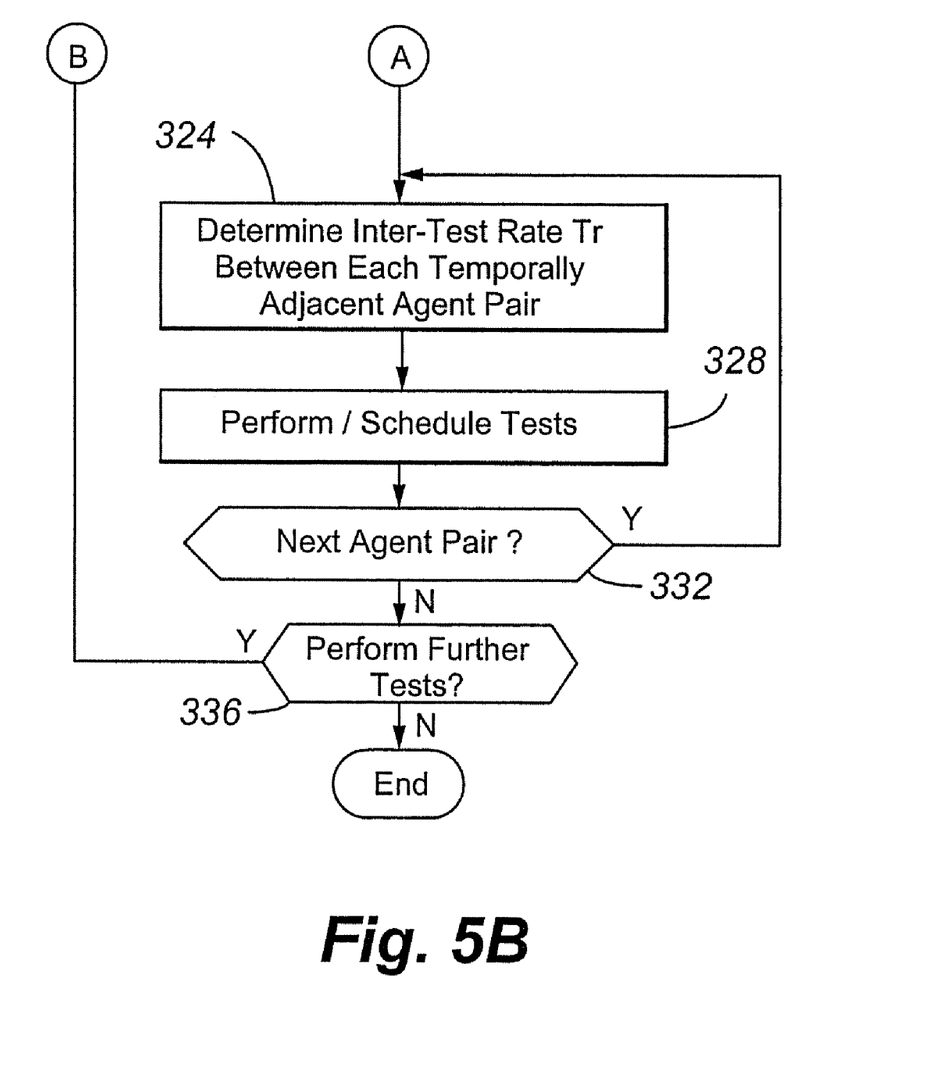
FIG. 5B is a flow chart of scheduling server operation according to the embodiment of FIG. 5A.

Step 512 generates the second part of the test agent pair sequence using the equation:

For (l'=0; l'<GCD(N−Na,M); ++l')
For (k'=0; k'<LCM(N−Na,M); ++k')

$$i=(P')(k')+A+1 \mod(M)$$

$$j=(Q')(k')+l'+B'+1 \mod(N-Na)+Na$$

wherein P' is an integer selected to be coprime with M, A' is an integer between 0 and M−1 Q' is an integer selected to be coprime with N−Na, and B' is an integer between 0 and (N−Na)−1. Q', P', A', and B' can be changed from one cycle to the next.

An example will now be presented to illustrate the algorithm of the fourth embodiment. In the example, N=M=4, and the resulting number of different pairs should be 16.

Rules to pick P, Q, P', Q', A, A', B and B' are:
P,P' coprime with M
Q is coprime with Na
A, A'={0, . . . , M−1}
B={0, . . . , Na−1}
Q' is coprime with N−Na
B'={0, . . . , (N−Na)−1}

Step 504 is run with the values Na=2 and M=4, and a set of possible values for P, Q, A and B would be:
P=3
Q=1
A=3
B=0

Using the values Na=2, M=4, the GOD and LCM values are:
GCD(Na,M)=GCD(2,4)=2
LCM(Na,M)=LCM(2,4)=4
The possible values of l and k are:
l={0,1}
k={0, 1, 2, 3}:
For l=0, the (i,j) pairs generated for all the values of k are:
k=0: (4,1)
k=1: (3,2)
k=2: (2,1)
k=3: (1,2)
And for l=1, the generated pairs are:
k=0: (4,2)
k=1: (3,1)
k=2: (2,2)
k=3: (1,1)

Step 512 is run with the values Na=2 and M=4, and a set of possible values for P, Q', A and B' would be:
P'=1
Q'=1
A'=2
B'=1

Using the values N−Na=2 and M=4, the GCD and LCM values are:
GCD(N−Na,M)=GCD(2,4)=2
LCM(N−Na,M)=LCM(2,4)=4
The possible values of l' and k' are:
l'={0,1}
k'={0, 1, 2, 3}

For l'=0, the (i,j) pairs generated for all the values of k' are:
k'=0: (3,4)
k'=1: (4,3)
k'=2: (1,4)
k'=3: (2,3)
And for l'=1, the generated pairs are:
k'=0: (3,3)
k'=1: (4,4)
k'=2: (1,3)
k'=3: (1,3)

Note that the total of generated pairs is 16 as expected, and all pairs are different.

Note also that the order of generation is different from the order obtained with the prior embodiment. Different orderings in the third embodiment can be obtained simply by selecting different values for Q each time steps 504 and 512 are performed.

A number of variations and modifications of the invention can be used. It would be possible to provide for some features of the invention without providing others.

For example in one alternative embodiment, the scheduling agent is implemented in hardware (such as a logic circuit) or software (such as processor-executable instructions) or a combination thereof.

In another alternative embodiment, the scheduling algorithm is used to schedule events other than network measurements. As will be appreciated, the algorithms discussed herein can be used to schedule interactions between members of different sets of objects.

In yet another embodiment, the scheduling algorithm is modified to subdivide effectively one or both of the test agent sets into more than two subsets. This would be done to provide an even tighter bound on the IMT.

In yet another embodiment, the scheduling algorithm is modified to schedule object-to-object interactions among more than two objects. For example, three test agents from three different zones may be in each test agent pairing so that the test agents can mutually exchange test packets at specified times.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for scheduling events between first and second sets of objects, comprising:
  (a) a scheduling server, comprising a processor and memory, providing identifiers to members of first and second sets of objects, the identifiers used for the members of a set being unique within that set and the identifiers being typically consecutively numbered within each set;
  (b) the scheduling server using modular arithmetic to generate first and second sequences of the identifiers for each of the first and second sets, respectively, wherein the modular arithmetic is one of:

$i=i+1 \ (mod(N));$ $j=j+1 \ (mod(M));$ \hfill (b')

wherein the first and second sets of objects are coprime, wherein i is the identifier for a selected object in the first set, j is the identifier for a selected object in the second set, wherein N is the number of members in the first set, and wherein M is the number of members in the second set;

$i=k+1 \ mod(N);$ $j=k+l+1 \ mod(M);$ \hfill (b'')

wherein i is the identifier for a selected object in the first set, j is the identifier for a selected object in the second set, wherein k and l are whole numbers selected such that l<Greatest Common Divisor (N, M) and k<Least Common Multiple (N, M), wherein N is the number of members in the first set, and wherein M is the number of members in the second set;

$i=(P)(k)+A+1 \ mod(M);$ $j=(Q)(k)+l+B+1 \ mod(N);$ \hfill (b''')

wherein i is the identifier for a selected object in the first set, j is the identifier for a selected object in the second set, wherein k and l are whole numbers selected such that l<Greatest Common Divisor (N, M) and k<Least Common Multiple (N, M), wherein N is the number of members in the first set, wherein M is the number of members in the second set, wherein P is an integer selected to be coprime with M, wherein Q is an integer selected to be coprime with N, A is an integer selected to be between 0 and (M−1), and B is an integer selected to be between 0 and (N−1);
  where Q, P, A and B can be changed from one cycle to the next
  (c) the scheduling server associating identifiers from the first and second sequences to provide a plurality of groupings of identifiers, each grouping of identifiers comprising at least one identifier from each of the first and second sequences; and (d) the scheduling server scheduling a corresponding event for each of the grouping of identifiers.

2. The method of claim 1, wherein the memberships of the first and second sets of objects are not coprime.

3. The method of claim 2, wherein step (b2) is performed using the following algorithm:

$i=i+1 \pmod{Na}$; and $j=j+1 \pmod{M}$; and wherein step (b3) is performed using the following algorithm:

$i=i+1 \pmod{N-Na}+Na$; and $j=j+1 \pmod{M}$;

wherein i is the identifier for a selected object in the first set, j is the identifier for a selected object in the second set, wherein N is the number of members in the first set, wherein M is the number of members in the second set, wherein Na is coprime to M, and wherein N−Na is coprime with M.

4. The method of claim 1, further comprising:

(e) reordering the plurality of groupings of identifiers.

5. The method of claim 1, wherein step (d) comprises:

(d1) selecting a first identifier grouping in the plurality of groupings of identifiers;

(d2) generating a pseudo-random number;

(d3) converting the pseudo-random number into a floating point number;

(d4) converting the floating point number into a delta value; and (d5) combining the delta value with at least one of a selected time interval and clock value to provide a scheduled time for a first event corresponding to the first identifier grouping.

6. The method of claim 1, wherein step (b2) is further performed using the following algorithm:

$i=k+1 \bmod(M)$;

$j=(k+l)+1 \bmod(Na)$;

wherein k and l are whole numbers selected such that l<Greatest Common Divisor and (Na, M) and (k<Least Common Multiple (Na, M); and wherein step (b3) is performed using the following algorithm: $i=k'+1 \bmod(M); j=(k'+l')+1 \bmod(N-Na)+Na$; and wherein k' and l' are whole numbers selected such that l'<Greatest Common Divisor and (N−Na, M) and (k'<Least Common Multiple (N−Na, M).

7. The system of claim 1, wherein operation (b2) is performed using the following algorithm:

$i=(P)(K)+A+1 \bmod(M)$;

$j=(Q)(K)+l+B+1 \bmod(Na)$;

wherein K and l are whole numbers selected such that l<Greatest Common Divisor (Na, M) and K<Least Common Multiple (Na,M), wherein P is an integer selected to be coprime with M, Q is an integer selected to be coprime with Na, A is an integer between 0 and (M−1), and B is an integer between 0 and (Na−1); and wherein step (b3) is performed using the following algorithm:

$i=(P')(k')+A'+1 \bmod(M)$ $j=(Q')(k')+l+B'+1 \bmod(N-Na)+Na$ wherein k' and l' are whole numbers selected such that l'<Greatest Common Divisor (N−Na, M) and k'<Least Common Multiple (N−Na, M), wherein P' is an integer selected to be coprime with M, wherein Q is an integer selected to be coprime with (N−Na), A' is an integer selected to be between 0 and (M−1), and B' is an integer selected to be between 0 and (N−Na)−1; and wherein Q, P, A, B, P', Q', A' and B' can be changed from one cycle to the next.

8. The method of claim 1, where step (a) comprises assigning identifiers to the first and second sets of objects at random.

9. A non-transitory computer readable medium comprising processor executable instructions to perform all the steps of claim 1.

10. A system for scheduling an event, comprising:

a scheduling server, comprising:

a memory;

a processor in communication with the memory, the processor operable to execute a scheduling agent, the scheduling agent operable to:

(a) provide identifiers to members of first and second sets of objects, the identifiers used for the members of a set being unique within that set and the identifiers being consecutively numbered within each set;

(b) use modular arithmetic to generate first and second sequences of the identifiers for each of the first and second sets, respectively, wherein the modular arithmetic is one of:

$i=i+1 \pmod{N}$;

$j=j+1 \pmod{M}$;     (b')

wherein the first and second sets of objects are coprime, wherein i is the identifier for a selected object in the first set, j is the identifier for a selected object in the second set, wherein N is the number of members in the first set, and wherein M is the number of members in the second set;

$i=k+1 \bmod(N)$;

$j=k+l+1 \bmod(M)$;     (b'')

wherein i is the identifier for a selected object in the first set, j is the identifier for a selected object in the second set, wherein k and l are whole numbers selected such that l<Greatest Common Divisor (N, M) and k<Least Common Multiple (N, M), wherein N is the number of members in the first set, and wherein M is the number of members in the second set;

$i=(P)(k)+A+1 \bmod(M)$;

$i=(Q)(k)+l+B+1 \bmod(N)$;     (b''')

wherein i is the identifier for a selected object in the first set, j is the identifier for a selected object in the second set, wherein k and l are whole numbers selected such that l<Greatest Common Divisor (N, M) and k<Least Common Multiple (N, M), wherein N is the number of members in the first set, wherein M is the number of members in the second set, wherein P is an integer selected to be coprime with M, wherein Q is an integer selected to be coprime with N, A is an integer selected to be between 0 and (M−1), and B is an integer selected to be between 0 and (N−1);

(c) associate identifiers from the first and second sequences to provide a plurality of groupings of identifiers, each grouping of identifiers comprising at least one identifier from each of the first and second sequences; and (d) schedule a corresponding event for each of the grouping of identifiers.

11. A method for scheduling events between first and second sets of objects, comprising:

(a) a scheduling server, comprising a processor and memory, providing identifiers to members of first and second sets of objects, the identifiers used for the members of a set being unique within that set and the identifiers being typically consecutively numbered within each set;

(b) the scheduling server using modular arithmetic to generate first and second sequences of the identifiers for each of the first and second sets, respectively, wherein generating the first and second sequences comprises:

(b1) dividing the first set into at least first and second subsets of objects, wherein the memberships of the at least first and second subsets of objects are coprime with the membership of the second set of objects;

(b2) using modular arithmetic to generate first and second partial sequences of the identifiers for each of the first subset and second set, respectively;

(b3) using modular arithmetic to generate third and fourth partial sequences of the identifiers for each of the second subset and second set, respectively, wherein the first sequence includes the first and third partial sequences and the second sequence includes the second and fourth partial sequences;

(c) the scheduling server associating identifiers from the first and second sequences to provide a plurality of groupings of identifiers, each grouping of identifiers comprising at least one identifier from each of the first and second sequences; and (d) the scheduling server scheduling a corresponding event for each of the grouping of identifiers.

12. The method of claim 11, wherein the memberships of the first and second sets of objects are not coprime.

13. The method of claim 11, wherein step (b2) is performed using the following algorithm:

$i = i+1 \pmod{Na}$;

$j = j+1 \pmod{M}$;

wherein step (b3) is performed using the following algorithm:

$i = i+1 \pmod{N-Na} + Na$;

$j = j+1 \pmod{M}$; and wherein i is the identifier for a selected object in the first set, j is the identifier for a selected object in the second set, wherein N is the number of members in the first set, wherein M is the number of members in the second set, wherein Na is coprime to M, and wherein N−Na is coprime with M.

14. The method of claim 11, wherein step (b2) is further performed using the following algorithm:

$i = k+1 \bmod(M)$;

$j = (k+l)+1 \bmod(Na)$;

wherein k and l are whole numbers selected such that l<Greatest Common Divisor and (Na, M) and (k<Least Common Multiple (Na, M);

wherein step (b3) is performed using the following algorithm:

$i = k'+1 \bmod(M)$;

$j = (k'+l')+1 \bmod(N-Na)+Na$; and wherein k' and l' are whole numbers selected such that l'<Greatest Common Divisor and (N−Na, M) and (k'<Least Common Multiple (N−Na, M).

15. The method of claim 11, wherein step (b2) is further performed using the following algorithm:

$i = (P)(K)+A+1 \bmod(M)$;

$j = (Q)(K)+l+B+1 \bmod(Na)$;

wherein K and l are whole numbers selected such that l<Greatest Common Divisor (Na, M) and K<Least Common Multiple (Na, M), wherein P is an integer selected to be coprime with M, Q is an integer selected to be coprime with Na, A is an integer between 0 and (M−1), and B is an integer between 0 and (Na−1);

wherein step (b3) is performed using the following algorithm:

$i = (P')(k')+A'+1 \bmod(M)$;

$j = (Q')(k')+l'+B'+1 \bmod(N-Na)+Na$;

wherein k' and l' are whole numbers selected such that l'<Greatest Common Divisor (N−Na, M) and k'<Least Common Multiple (N−Na, M), wherein P' is an integer selected to be coprime with M, wherein Q' is an integer selected to be coprime with (N−Na), A' is an integer selected to be between 0 and (M−1), and B' is an integer selected to be between 0 and (N−Na)−1; and wherein Q, P, A, B, Q', B', A' and B' can be changed from one cycle to the next.

16. A system for scheduling an event, comprising:

a scheduling server, comprising:

a memory; and a processor in communication with the memory, the processor operable to execute the scheduling server executing a scheduling agent,; and the scheduling agent operable to:

(a) provide identifiers to members of first and second sets of objects, the identifiers used for the members of a set being unique within that set and the identifiers being consecutively numbered within each set;

(b) use modular arithmetic to generate first and second sequences of the identifiers for each of the first and second sets, respectively, wherein using modular arithmetic comprises:

(b1) dividing the first set into at least first and second subsets of objects, wherein the memberships of the at least first and second subsets of objects are coprime with the membership of the second set of objects;

(b2) using modular arithmetic to generate first and second partial sequences of the identifiers for each of the first subset and second set, respectively; and (b3) using modular arithmetic to generate third and fourth partial sequences of the identifiers for each of the second subset and second set, respectively, wherein the first sequence includes the first and third partial sequences and the second sequence includes the second and fourth partial sequences;

(c) associate identifiers from the first and second sequences to provide a plurality of groupings of identifiers, each grouping of identifiers comprising at least one identifier from each of the first and second sequences; and (d) schedule a corresponding event for each of the grouping of identifiers.

17. The system of claim 16, wherein the memberships of the first and second sets of objects are not coprime.

18. The system of claim 16, wherein operation (b2) is performed using the following algorithm:

$i=i+1 \pmod{Na}$; and $j=j+1 \pmod{M}$; and wherein operation (b3) is performed using the following algorithm:

$i=i+1 \pmod{N-Na}+Na$; and $j=j+1 \pmod{M}$;

wherein i is the identifier for a selected object in the first set, j is the identifier for a selected object in the second set, wherein N is the number of members in the first set, wherein M is the number of members in the second set, wherein Na is coprime to M, and wherein N−Na is coprime with M.

19. The system of claim 16, wherein operation (b2) is performed using the following algorithm:

$i=k+1 \bmod(M)$;

$j=(k+l)+1 \bmod(Na)$;

wherein k and l are whole numbers selected such that l<Greatest Common Divisor (Na, M) and k Least Common Multiple (Na,M); and wherein step (b3) is performed using the following algorithm: $i=k'+1 \bmod(M)$; $j=(k'+l')+1 \bmod(N-Na)+Na$; and wherein k' and l' are whole numbers selected such that l'<Greatest Common Divisor and (N−Na, M) and (k'<Least Common Multiple (N−Na, M).

20. The system of claim 16, wherein operation (b2) is performed using the following algorithm:

$i=(P)(K)+A+1 \bmod(M)$;

$j=(Q)(K)+l+B+1 \bmod(Na)$;

wherein K and l are whole numbers selected such that l<Greatest Common Divisor (Na, M) and K<Least Common Multiple (Na,M), wherein P is an integer selected to be coprime with M, Q is an integer selected to be coprime with Na, A is an integer between 0 and (M−1), and B is an integer between 0 and (Na−1); and wherein step (b3) is performed using the following algorithm:

$i=(P')(k')+A'+1 \bmod(M)$ $j=(Q')(k')+l'+B'+1 \bmod(N-Na)+Na$ wherein k' and l' are whole numbers selected such that l'<Greatest Common Divisor (N−Na, M) and k'<Least Common Multiple (N−Na, M), wherein P' is an integer selected to be coprime with M, wherein Q is an integer selected to be coprime with (N−Na), A' is an integer selected to be between 0 and (M−1), and B' is an integer selected to be between 0 and (N−Na)−1; and wherein Q, P, A, B, P', Q', A' and B' can be changed from one cycle to the next.

* * * * *